F. E. KLING AND L. B. WEIDLEIN.
FILTERING MAT.
APPLICATION FILED MAR. 11, 1920.
1,395,833.
Patented Nov. 1, 1921.
2 SHEETS—SHEET 2.
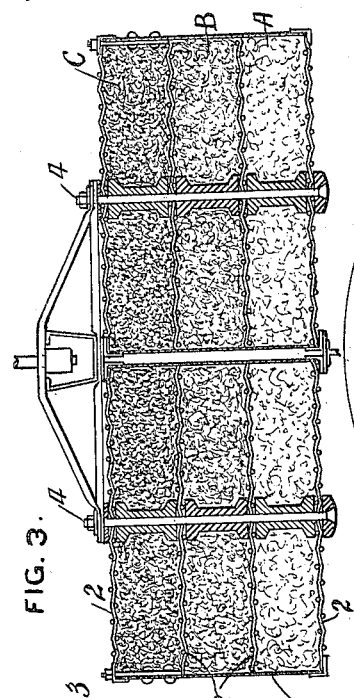
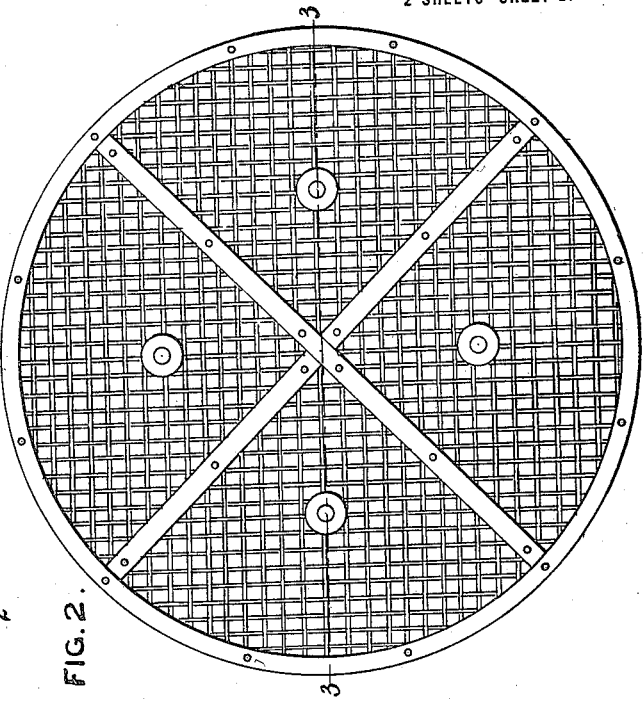
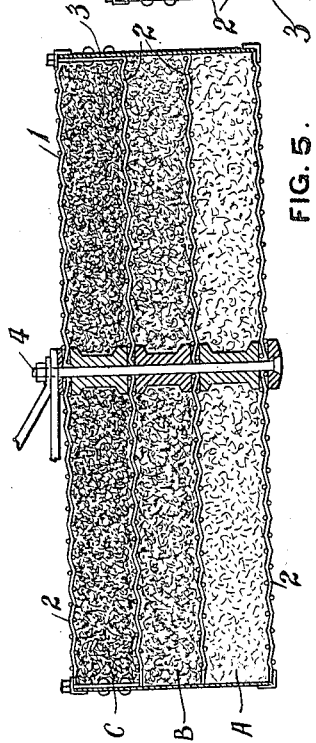
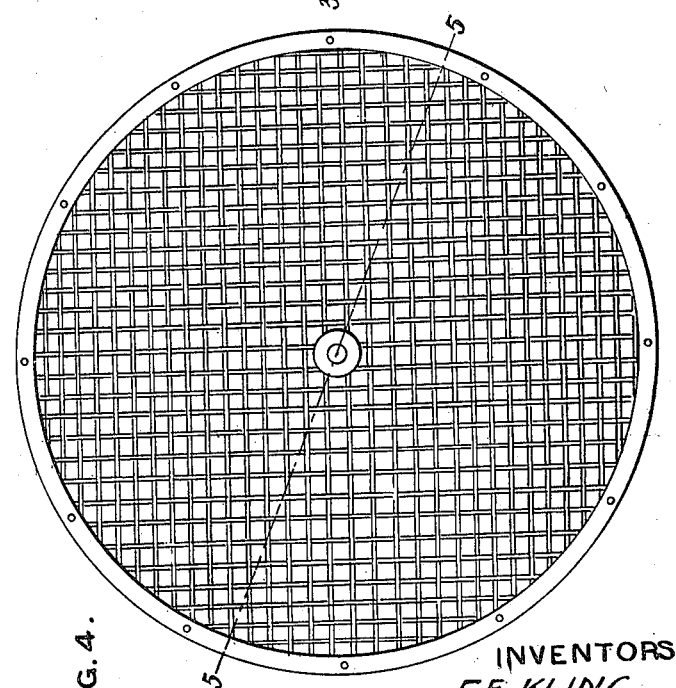
INVENTORS
F. E. KLING.
L. B. WEIDLEIN

UNITED STATES PATENT OFFICE.

FRED E. KLING, OF YOUNGSTOWN, AND LUTHER B. WEIDLEIN, OF CLEVELAND, OHIO.

FILTERING-MAT.

1,395,833. Specification of Letters Patent. Patented Nov. 1, 1921.

Application filed March 11, 1920. Serial No. 364,966.

*To all whom it may concern:*

Be it known that we, FRED E. KLING and LUTHER B. WEIDLEIN, citizens of the United States, and residents of Youngstown, in the county of Mahoning and State of Ohio, and Cleveland, in the county of Cuyahoga and State of Ohio, respectively, have invented certain new and useful Improvements in Filtering-Mats, of which the following is a specification.

This invention relates to filters for gases, and more particularly to filters for heated combustible gases.

One object of the invention is to provide a filter for gases in which the filtering medium is so arranged that it may be readily agitated to shake out collected dust without removal of the filtering material from position in the filter.

A further object of the invention is to arrange the filtering material in a mat or layer of graduated density, or in a plurality of mats or layers of graduated density so that the bulk of the heavier dust in the gases will be deposited in the layer of least density, thus avoiding clogging of the filter; this arrangement being also such that the dust collected in the layer or plurality of layers of greater density may be readily shaken through the part of a layer of lesser density, or layers of lesser density.

Referring now to the drawings, Figure 1 is a fragmentary section through the filter.

Fig. 2 is a plan view of one form of filtering mat construction.

Fig. 3 is a section therethrough on the line 3—3 of Fig. 2.

Fig. 4 is a plan showing another form of mat.

Fig. 5 is a section through a construction composed of such mats and taken on the line 5—5 of Fig. 4.

Figure 1:
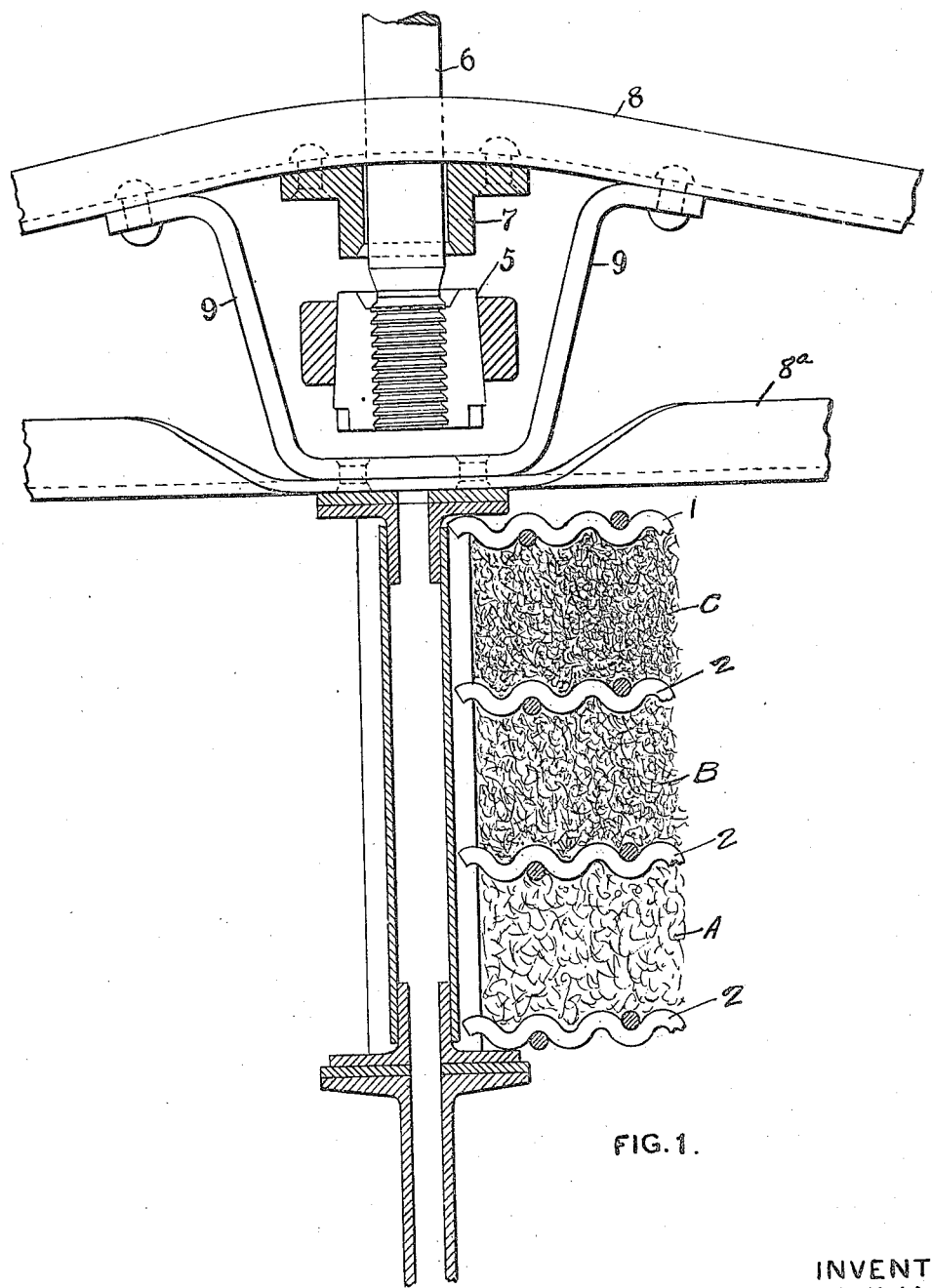

In the accompanying drawings the filter proper comprises a plurality of mats 1 constructed of a suitable filtering material such as steel, or other metal wool, set between screens 2 of wire, expanded metal, or the like. The mats 1 of the filter are held in close mutual relation by means of a frame 3 surrounding the edges of all of the mats. Supporting rods 4 are arranged to extend through the mats and prevent sagging thereof and to transmit vibration thereto during the shaking operations in freeing the mats of the accumulated dust.

In fabricating the filter, the lowermost mat "A," which is the mat through which the gases first pass, contains filtering material which is loosely packed so that it offers relatively little resistance to the passage of the gases. Such material is, however, packed tightly enough to free the gases of a large proportion of the coarser dust contained in it. The next succeeding mat "B" of the filter is packed more tightly than is the mat "A." Mat "C" is packed more tightly than is the mat "B."

Obviously a single mat may be employed instead of a plurality of the mats as shown with the mat of a density which varies from very coarse at one side to comparatively dense at the opposite side of the mat. Additional mats also may be added if so desired, and in such case succeeding mats will be of progressively increased density throughout the entire series.

In the use of the filter, the gases passing through the mat "A" leaves the coarser particles of the solid material carried in suspension in the gases in this mat, which, due to its loose structure, does not tend to become readily clogged, and permits ready passage of the gas through to the succeeding mats. In these mats the gases are relieved of the more finely divided solid matter in suspension therein.

Referring to Fig. 1 of the drawings, the filtering mats may be shaken by means of a hammer 5 mounted on the extremity of a rod 6 and arranged to strike against a block 7 on a yoke or frame 8. This jarring mechanism is the subject matter of our copending application, Serial No. 436,992, filed January 13, 1921. The yoke 8 is connected directly to the supporting rods of the filtering mats 1 by means of the brace members 9, which are riveted to the upper member and lower member 8ᵃ of the yoke or frame 8.

It is important that the yoke is not fastened in any way to the frame 3 for the filtering mats, so that the hammer blows are transmitted to the mat and are not absorbed by the frame 3.

When the filtering mats have become laden with finely divided impurities in the form of dust from the gases and it is necessary to clean the filter, the filtering mat structure is jarred to shake out the accumulation of dust. This jarring action is effected by lowering the rods 6 a short distance and bringing the hammer 5 into sharp contact with the block 7. This upward stroke acting through the yoke 8, and the supporting rods 4, tends to shake the dust downwardly through the mats and deposit it in the filtering receptacle. Since the lower mat or mats are of less density than the overlying mat or mats, the dust is first shaken from the lower ones, and dust shaken from the upper mats can pass downwardly through the entire structure.

The filter may be cleaned while in position by this simple jarring operation, and does not become so clogged that the dust or finely divided impurities in the mats is difficult to dislodge.

The advantages of our invention, which will be appreciated by those skilled in the art, arise from the way in which the filtering mats are constructed so as to facilitate the removal of accumulations of dust and other finely divided impurities therefrom by jarring or shaking the mats.

We claim:—

1. In apparatus for cleaning gases, a composite gas filter comprising a frame and a plurality of metallic wool mats in said frame, said mats being supported in intimate relation with each other and the mat adjacent the gas inlet being of the least density, and additional supports extending through all of the mats and arranged to transmit vibrations thereto.

2. In apparatus for cleaning gases, a composite gas filter comprising a frame, more than one mat of metallic wool in said frame, said mats being supported in intimate relation with each other, the mat adjacent the inlet for the gases being of the least density and succeeding mats being of progressively increased density, and additional supports extending through all of the mats and arranged to transmit vibrations thereto.

3. In apparatus for cleaning gases, a composite filter comprising a frame, a plurality of mats of metallic wool in said frame, wire mesh partitions between said mats, said mats being supported in intimate relation with each other, the mat nearest the inlet for the gases being of least density, and succeeding mats being of progressively increased density, and sectional supports extending through all of the mats and clamped against said screen partitions, said supports being arranged to transmit vibrations to said mats.

4. In apparatus for cleaning gases, a composite gas filter comprising a frame, more than one mat of filtering material in said frame, said mats being supported in intimate relation with each other, the mat adjacent the inlet for the gases being of the least density and succeeding mats being of progressively increased density, and additional supports extending vertically through all of the mats and arranged to transmit vibrations thereto.

5. In apparatus for cleaning gases, a composite gas filter comprising an inclosing side frame, a plurality of mats composed of metallic wool secured within said frame, wire mesh partitions between said mats, said mats being supported in intimate relation with each other, the mat nearest the inlet for the gases being of least density, and succeeding mats being of progressively increased density.

In testimony whereof we have hereunto set our hands.

FRED E. KLING.
LUTHER B. WEIDLEIN.